(12) United States Patent
Kwong et al.

(10) Patent No.: US 11,064,180 B2
(45) Date of Patent: Jul. 13, 2021

(54) CONVOLUTIONAL NEURAL NETWORK BASED SYNTHESIZED VIEW QUALITY ENHANCEMENT FOR VIDEO CODING

(71) Applicant: City University of Hong Kong, Kowloon (HK)

(72) Inventors: Tak Wu Sam Kwong, Kowloon (HK); Linwei Zhu, Kowloon (HK); Yun Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 91 days.

(21) Appl. No.: 16/160,659

(22) Filed: Oct. 15, 2018

(65) Prior Publication Data

US 2020/0120324 A1 Apr. 16, 2020

(51) Int. Cl.
| | |
|---|---|
| H04N 13/122 | (2018.01) |
| H04N 13/161 | (2018.01) |
| H04N 13/111 | (2018.01) |
| G06T 5/00 | (2006.01) |
| G06N 3/08 | (2006.01) |
| G06T 5/20 | (2006.01) |

(52) U.S. Cl.
CPC ............ *H04N 13/161* (2018.05); *G06N 3/08* (2013.01); *G06T 5/006* (2013.01); *G06T 5/20* (2013.01); *H04N 13/111* (2018.05); *H04N 13/122* (2018.05); *G06T 2207/10016* (2013.01); *G06T 2207/20084* (2013.01); *H04N 2213/003* (2013.01)

(58) Field of Classification Search
None
See application file for complete search history.

(56) References Cited

U.S. PATENT DOCUMENTS

| | | |
|---|---|---|
| 8,705,852 B2 | 4/2014 | Oh et al. |
| 9,288,506 B2 | 3/2016 | Chen et al. |
| 9,307,252 B2 | 4/2016 | Zhang et al. |

(Continued)

OTHER PUBLICATIONS

Fehn, C. "Depth-Image-Based Rendering (DIBR), Compression, and Transmission for a New Approach on 3D-TV," Proc. SPIE 5291, Stereoscopic Displays and Virtual Reality Systems XI, pp. 93-104, 2004, 12 pages.

(Continued)

*Primary Examiner* — Mulugeta Mengesha
*Assistant Examiner* — Charles N Hicks
(74) *Attorney, Agent, or Firm* — Norton Rose Fulbright US LLP

(57) ABSTRACT

Systems and methods which provide Convolutional Neural Network (CNN) based synthesized view quality enhancement for video coding are described. Embodiments may comprise an encoder configured for CNN based synthesized view quality enhancement configured to provide improved coding efficiency while maintaining synthesized view quality. Additionally or alternatively, embodiments may comprise a virtual viewpoint generator configured for CNN based synthesized view quality enhancement configured provide post-processing of the synthesized view at the decoder side to reduce the artifacts. CNN based synthesized view quality enhancement may, for example, be provided for 3D video coding to improve its coding efficiency, which can be utilized in 3D scenarios, such as 3DTV.

24 Claims, 7 Drawing Sheets

(56) References Cited

U.S. PATENT DOCUMENTS

| | | | |
|---|---|---|---|
| 9,503,702 | B2 | 11/2016 | Chen et al. |
| 9,699,462 | B2 | 7/2017 | Gu et al. |
| 9,877,008 | B2 | 1/2018 | Tech et al. |
| 9,930,363 | B2 | 3/2018 | Rusanovskyy et al. |
| 9,961,370 | B2 | 5/2018 | Chen et al. |
| 10,154,245 | B2 | 12/2018 | Tech et al. |
| 2017/0324961 | A1 | 11/2017 | Jin et al. |
| 2018/0137611 | A1* | 5/2018 | Kwon .................. G06T 3/0093 |
| 2018/0350110 | A1* | 12/2018 | Cho ....................... G06T 9/004 |
| 2019/0108396 | A1* | 4/2019 | Dal Mutto .............. G06T 7/174 |

OTHER PUBLICATIONS

Tech, G. et al. "3D Video Coding Using the Synthesized View Distortion Change," 2012 Picture Coding Symposium, pp. 25-28, Krakow, Poland, May 7-9, 2012, 4 pages.

Zhang, K. et al. "Beyond a Gaussian Denoiser: Residual Learning of Deep CNN for Image Denoising," IEEE Trans. Image Process., vol. 26, No. 7, pp. 3142-3155, Jul. 2017, 14 pages.

Muller, K. et at. "Common Test Conditions of 3DV Core Experiments," JCTVC of ITU-T SG16 WP3 and ISO/IEC JTC 1/SC 29/WG11, Tech. Rep. Doc. JCT3V-G1100, San Jose, U.S., Jan. 11-17, 2014, 7 pages.

Oh, B. T. et al. "View Synthesis Distortion Estimation for AVC- and HEVC-Compatible 3-D Video Coding," IEEE Trans. Circuits Syst. Video Technol., vol. 24, No. 6, pp. 1006-1015, Jun. 2014, 10 pages.

Zhang, Y. et al. "High-Efficiency 3D Depth Coding Based on Perceptual Quality of Synthesized Video," IEEE Trans. Image Process., vol. 25, No. 12, pp. 5877-5891, Dec. 2016, 15 pages.

Ioffe, S. et al. "Batch Normalization: Accelerating Deep Network Training by Reducing Internal Covariate Shift," International Conference on Machine Learning, vol. 37, pp. 448-456, Lille, France, Jul. 7-9, 2015, 11 pages.

Tech, G. "JCT-3V AHG Report: MV-HEVC and 3D-HEVC Software Integration (AHG2)," JCT-VC of ITU-T SG 16 WP 3 and ISO/IEC JTC 1/SC 29/WG 11, Tech. Re . Doc. JCT3VO0002, Geneva, CH, May 27-31, 2016. [Online] Available: https://hevc.hhi.fraunhofer.de/svn/svn_3DVCSoftware/tags/HTM-16.2, 2 pages.

Lipski, C. et al. "Correspondence and Depth-Image Based Rendering a Hybrid Approach for Free-Viewpoint Video," IEEE Trans. Circuits Syst. Video Technol., vol. 24, No. 6, pp. 942-951, Jun. 2014, 9 pages.

Tech, G. et al. "Overview of the Multiview and 3D Extensions of High Efficiency Video Coding," IEEE Trans. Circuits Syst. Video Technol., vol. 26, No. 1, pp. 35-49, Jan. 2016, 15 pages.

Yuan, H. et al. "Coding Distortion Elimination of Virtual View Synthesis for 3D Video System: Theoretical Analyses and Implementation," IEEE Trans. Broadcast., vol. 58, No. 4, pp. 558-568, Dec. 2012, 11 pages.

Zhu, L. et al. "View Synthesis Distortion Elimination Filter for Depth Video Coding in 3D Video Broadcasting," Multimed. Tools Appl., vol. 74, No. 15, pp. 5935-5954, Jul. 2015, 20 pages.

* cited by examiner

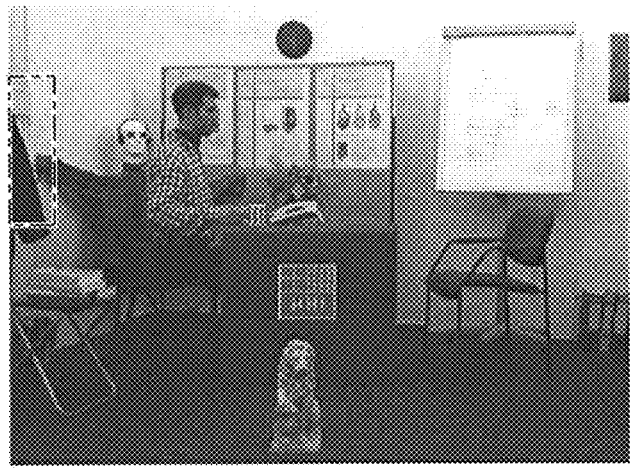
FIG. 1A
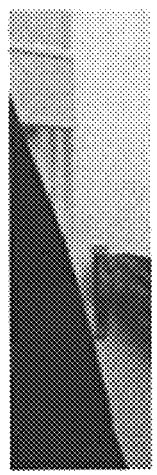 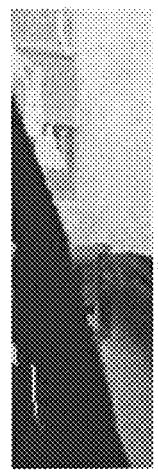 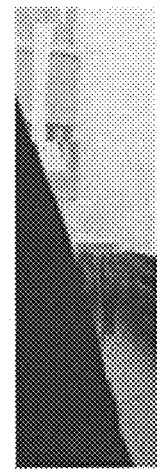 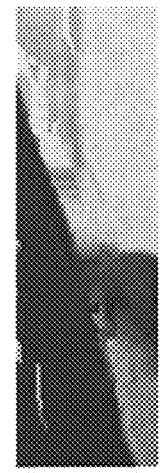 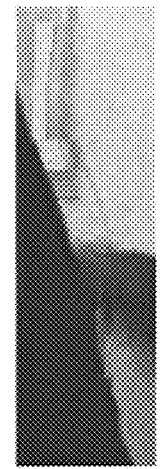
FIG. 1B  FIG. 1C  FIG. 1D  FIG. 1E  FIG. 1F

CONVOLUTIONAL NEURAL NETWORK BASED SYNTHESIZED VIEW QUALITY ENHANCEMENT FOR VIDEO CODING

TECHNICAL FIELD

The invention relates generally to video coding and, more particularly, to Convolutional Neural Network (CNN) based synthesized view quality enhancement for video coding.

BACKGROUND OF THE INVENTION

Demand for Three Dimensional (3D) videos that are able to offer an immersive environment to viewers has dramatically increased in recent years. In contrast to the traditional Two Dimensional (2D) videos, the multiple viewpoints of the 3D videos double or redouble the data volume in 3D video systems. This results in a vast proliferation of video data and brings great challenges to transmission and storage of the 3D video data.

Techniques, such as Multiview plus Depth (MVD), have been developed to more efficiently represent the 3D video data in 3D video systems. For example, with the help of depth information, various virtual viewpoints between two reference viewpoints can be generated by the technique of Depth Image Based Rendering (DIBR). Using such techniques, the video data at the positions of the synthesized views need not be stored or transmitted, but instead are synthesized as needed from a reduced set of 3D data. To further improve the coding efficiency, the 3D extension of High Efficiency Video Coding (3D HEVC) standard has been developed for joint texture and depth encoding. 3D HEVC techniques may, for example, be implemented with respect to video data to be stored or transmitted for reducing and removing redundant video data.

It should be appreciated that a depth map, such as used in MVD and DIBR techniques, is not directly viewed as part of a 3D video playback or other presentation. Accordingly, the quality of the depth information is generally not evaluated according to the same criteria as other data (e.g., texture data). For example, the quality of the depth information is typically not to be evaluated by the Mean Squared Error (MSE) between the original and distorted versions. Instead, the Synthesized View Distortion Change (SVDC) is measured and utilized in the Rate Distortion (RD) optimization for depth coding, and View Synthesis Optimization (VSO) is performed for depth coding performance optimization. Moreover, to reduce the computational complexity from view synthesis operation while maintaining coding efficiency, the View Synthesis Distortion (VSD) is estimated based on the depth map fidelity and texture characteristics.

The existing approaches improve the quality of the synthesized view by regarding the synthesized view from pristine texture and depth as the reference. This has largely ignored the distortions introduced in depth generation and view synthesis. Such distortions often result in poor image quality (e.g., the existence of spurious artifacts, distortion, etc.) with respect to the images of synthesized views.

BRIEF SUMMARY OF THE INVENTION

The present invention is directed to systems and methods which provide Convolutional Neural Network (CNN) based synthesized view quality enhancement for video coding. Embodiments may provide a CNN based synthesized view quality enhancement system comprising an encoder configured for CNN based synthesized view quality enhancement (referred to herein as a CNN based SVQ enhancement encoder) and/or a virtual viewpoint generator configured for CNN based synthesized view quality enhancement (referred to herein as a CNN based SVQ enhancement virtual viewpoint generator). Such a CNN based synthesized view quality enhancement system may be utilized with respect to Three Dimensional (3D) video coding in according with concepts herein. Embodiments of the invention may, for example, be utilized with respect to joint multi-view texture plus depth video coding, such as that of 3D High Efficiency Video Coding (3D HEVC). Embodiments of the present invention may be implemented with respect to 3D video codecs, next generation worldwide 3D multimedia systems, such as Free-Viewpoint Video (FVV), 3DTV broadcasting system, and 3D video recording, to significantly improve coding performance.

A CNN based SVQ enhancement encoder of embodiments of the present invention is configured to provide improved coding efficiency (e.g., achieving on the order of 25.9% and 11.7% bit rate saving in terms of Peak-Signal-to-Noise Ratio (PSNR) and Structural SIMilarity (SSIM) index metrics), while maintaining synthesized view quality. In facilitating operation of such a CNN based SVQ enhancement encoder, distortion elimination in a synthesized view may be formulated as an image restoration task with the aim to reconstruct latent distortion free synthesized image. Accordingly, CNN based reference synthesized view enhancement logic of an embodiment of a CNN based SVQ enhancement encoder may incorporate learned CNN models into 3D video codec (e.g., HEVC codec) to improve the view synthesis performance for both View Synthesis Optimization (VSO) and the final synthesized view. In operation of such CNN based reference synthesized view enhancement logic, the geometric and compression distortions may be considered according to the specific characteristics of a synthesized view. Lagrange multiplier logic of an embodiment of a CNN based SVQ enhancement encoder may derive the Rate-Distortion (RD) cost function to adapt the CNN based reference synthesized view enhancement logic VSO process to embrace better 3D video coding performance.

A CNN based SVQ enhancement virtual view point generator of embodiments of the present invention is configured provide post-processing of the synthesized view at the decoder side to reduce the artifacts. In operation of such a CNN based SVQ enhancement virtual view point generator, CNN based post-processing logic may implement learned CNN models to remediate mixed distortions with both warping distortion and compression distortion. As such, different CNN training strategies may be adopted with respect to the CNN based reference synthesized view enhancement logic of an embodiment of a CNN based SVQ enhancement encoder and the CNN based post-processing logic of a CNN based SVQ enhancement virtual view point generator of embodiments of the invention.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

FIGS. 1A-1F illustrate the causes of distortion of a synthesized view;

DETAILED DESCRIPTION OF THE INVENTION

Figure 2:
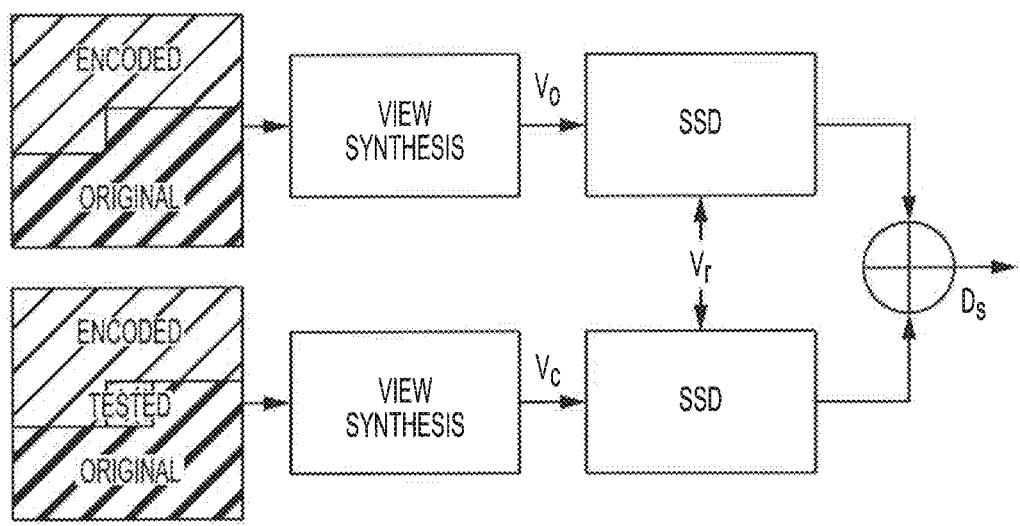
FIG. 2 illustrates circuitry for obtaining reconstructed depth blocks from SSD between the original depth map and encoded depth map.

Techniques, such as Multiview plus Depth (MVD), have been developed to more efficiently represent Three Dimensional (3D) video data in 3D video systems. MVD is, for example, used as data representation in 3D video systems whereby texture and depth data are both compressed and transmitted to the client to generate virtual views for 3D perception and interactive functions. In the MVD data format, the virtual viewpoints are typically generated with Depth Image Based Rendering (DIBR). One of the key techniques in DIBR is 3D warping (see C. Fehn, "Depth image based rendering (DIBR), compression, and transmission for a new approach on 3DTV", *Stereoscopic Displays and Virtual Reality Systems XI*, vol. 5291, pp. 93-104, San Jose, Calif., United States, Jan. 19-22, 2004, the disclosure of which is incorporated herein by reference), which maps the pixel $p_1=\{x_1,y_1,1\}^T$ in reference viewpoint to the pixel $p_2=\{x_2,y_2,1\}^T$ in the virtual viewpoint according to:

$$s_2 p_2 = s_1 A_2 R_2 R_1^{-1} A_1^{-1} p_1 - A_1 R_2 R_1^{-1} t_1 + A_2 t_2, \quad (1)$$

where $s_1$ is the depth value of reference viewpoint at position $(x_1,y_1)$ and $s_2$ is a scaling factor. In equation (1) above, $A_1$ and $A_2$ are intrinsic parameters, $R_1$ and $R_2$ are rotation matrices, and $t_1$ and $t_2$ are translation vectors of the reference and virtual cameras, respectively.

It should be appreciated that the parameters of $A_1$, $A_2$, $R_1$, $R_2$, $t_1$ and $t_2$ in equation (1) essentially remain constants when the positions of the reference and virtual viewpoints are fixed. Therefore, the distortion of a synthesized view may be understood as originating from both the depth and texture degradations. In particular, if the quality of the depth map is degraded, the location of the pixel $p_2$ will be shifted, which can be regarded as the warping distortion in view synthesis. Moreover, compression artifacts induced in the texture image of the reference viewpoint will also directly influence the quality of the synthesized image.

FIGS. 1A-1F illustrate the forgoing causes of distortion of a synthesized view. FIG. 1A shows a first frame of an exemplary video sequence (e.g., a video sequence entitled "Bookarrival"). FIGS. 1B-1F show enlarged portions of the video sequence frame of FIG. 1A from various views. In particular, FIG. 1B shows a portion of the image captured by a camera at view 8, while FIGS. 1C-1F show portions of images synthesized from cameras at views 6 and 10, under different settings (e.g., Quantization Parameters (QPs)), to synthesize view 8 for comparison. In the illustrated examples, FIG. 1C shows a portion of a synthesized image from views 6 and 10 with original texture and original depth, FIG. 1D shows a portion of a synthesized image from views 6 and 10 with original texture and encoded depth ($QP_d$=49), FIG. 1E shows a portion of a synthesized image from views 6 and 10 with encoded texture and original depth ($QP_t$=45), and FIG. 1F shows a portion of a synthesized image from views 6 and 10 with encoded texture and encoded depth ($QP_t$;$QP_d$)=(45, 49), where ($QP_t$, $QP_d$) indicate the QPs for texture and depth encoding. It can be appreciated from the examples of FIGS. 1B-1F that artifacts exist even in the image synthesized from original texture and original depth, as shown in FIG. 1C. Moreover, when both the warping+distortion and the texture coding distortion are encountered, the quality of the synthesized view is severely degraded, as shown in FIG. 1F.

In 3D High Efficiency Video Coding (3D HEVC), the measurement of the distortion from depth coding is not only determined by depth map distortion between the original and the reconstructed depth blocks $D_d$, but also by the Synthesized View Distortion Change (SVDC) $D_s$. Accordingly, the Rate Distortion (RD) cost function with respect to 3D HEVC is formulated as:

$$\min\{J\}, J=\eta_s D_s + \eta_d D_d + \lambda R, \quad (2)$$

where $\eta_s$ and $\eta_d$ are weighting factors, $\lambda$ is the Lagrange multiplier for mode decision and R is the depth coding bit. $D_d$ can be obtained by the Sum of Squared Differences (SSD) between the original depth map $S_d$ and encoded depth map $\tilde{S}_d$ as follows:

$$D_d = \sum_{(x,y)} D_d(x,y) = \sum_{(x,y)} [S_d(x,y) - \tilde{S}_d(x,y)]^2. \quad (3)$$

SVDC ($D_s$) is illustrated in FIG. 2 (see G. Tech, H. Schwarz, K. Muller, and T. Wiegand, "3D video coding using the synthesized view distortion change", 2012 *Picture Coding Symposium*, pp. 25-28, Krakow, Poland, May 7-9, 2012, the disclosure of which is incorporated herein by reference). $D_s$ can be calculated by the variation of a synthesized block when the depth map is modified from original to distorted values, and may be formulated as follows:

$$D_s = \sum_{(x,y)} [V_c(x,y) - V_r(x,y)]^2 - \sum_{(x,y)} [V_o(x,y) - V_r(x,y)]^2, \quad (4)$$

where $V_o$ is a synthesized view from depth maps comprising encoded depth data in already encoded blocks and original depth data in the to-be-encoded block, $V_c$ is a synthesized view from the depth map containing the distorted depth data for the current block, and $V_r$ is the reference synthesized view rendered from the original texture and depth.

It should be appreciated that, in real application scenarios, the image at the virtual viewpoint is generally not available in the case of MVD coding. Accordingly, an image synthesized from original texture and depth may be used for reference. However, artifacts may nevertheless be introduced, as shown in FIG. 1C. This may make the Rate Distortion Optimization (RDO) process less efficient.

Embodiments of the present invention facilitate improving the quality of the reference synthesized image by approaching the captured view as the reference with Convolutional Neural Network (CNN) processing techniques. Although some study has been undertaken with respect to use of a CNN model for image denoising (see e.g., K. Zhang, W. Zuo, Y. Chen, D. Meng and L. Zhang, "Beyond a Gaussian denoiser: residual learning of deep CNN for image denoising", *IEEE Trans. Image Process.*, vol. 26, no. 7, pp. 3142-3155, July 2017, the disclosure of which is incorporated herein by reference), embodiments of CNN based synthesized view quality enhancement utilize a CNN model for enhancing reference synthesized views. For example, embodiments of CNN based synthesized view quality enhancement utilize CNN based reference synthesized view enhancement logic with respect to a video coder implementation. Further, in view of the distortion $D_s$ being changed (e.g., to provide CNN based SVQ enhancement changed distortion $D_n$) according to embodiments, CNN based synthesized view quality enhancement implemented with respect to a video coder in accordance with concepts herein may implement Lagrange multiplier adaptation in applying this reference enhancement to 3D video coding (e.g., 3D HEVC). Embodiments of CNN based synthesized view quality enhancement additionally or alternatively utilize CNN based post-processing logic with respect to a video decoder implementation. For example, in light of the quality of final synthesized views being poor due to warping distortion and coding distortion, embodiments of CNN based synthesized view quality enhancement utilize CNN based post-processing with respect to a video decoder implementation to mitigate or eliminate these distortions. Embodiments of CNN based synthesized view quality enhancement utilized CNN based post-processing logic in a virtual viewpoint generator implementation.

Figure 3:
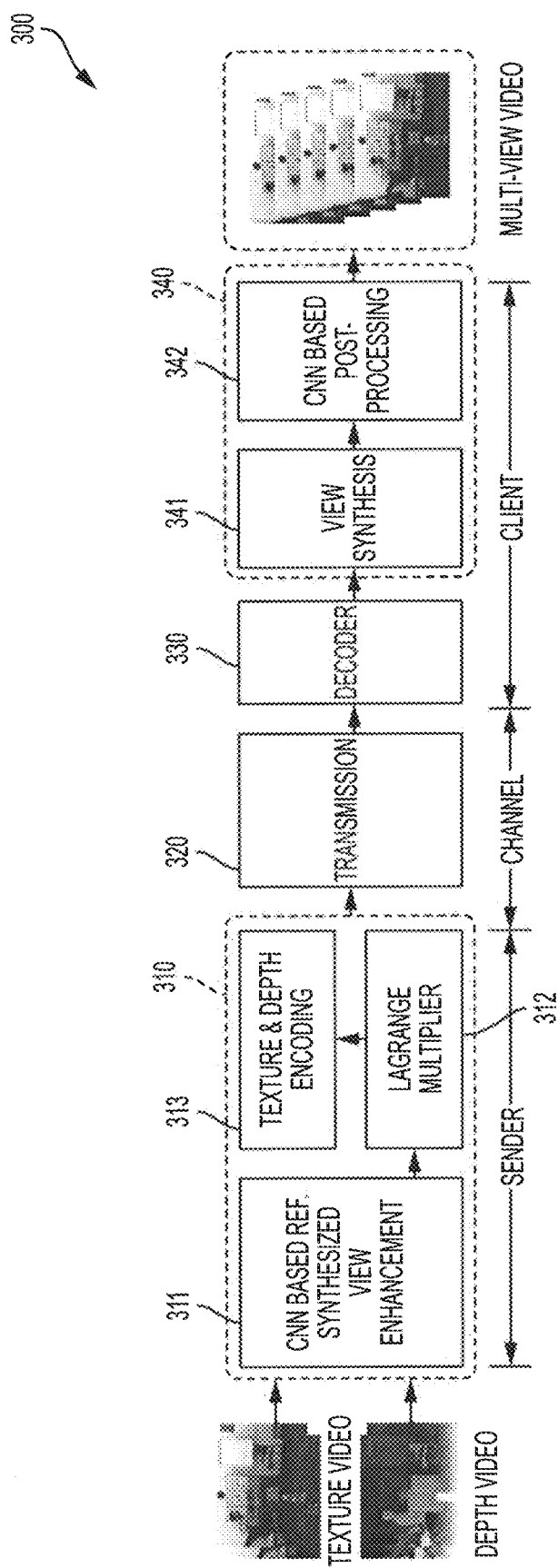
FIG. 3 shows a CNN based synthesized view quality enhancement system of embodiments of the present invention.

FIG. 3 shows an embodiment of a CNN based synthesized view quality enhancement system configured in accordance with the foregoing. In particular, CNN based synthesized view quality enhancement system 300 illustrated in FIG. 3 comprises CNN based reference synthesized view enhancement logic 311 and Lagrange multiplier logic 312 of embodiments of the present invention provided with respect to a video coder implementation (shown as CNN based SVQ enhancement encoder 310). CNN based synthesized view quality enhancement system 300 of the illustrated embodiment further comprises CNN based post-processing logic 342, shown as included in virtual viewpoint generator 340, provided with respect to a video decoder implementation (shown as decoder 330). It should be appreciated that, although the illustrated embodiment shows CNN based reference synthesized view enhancement logic 311 and Lagrange multiplier logic 312 implemented as functional blocks of a video encoder implementation, other configurations may be utilized in accordance with the concepts herein. For example, CNN based reference synthesized view enhancement logic and/or Lagrange multiplier logic of embodiments herein may be implemented as pre-processing functions to a video encoder. Similarly, although the illustrated embodiment shows CNN based post-processing logic 342 implemented as a functional block of a virtual viewpoint generator, other configurations may be utilized in accordance with the concepts herein. For example, CNN based post-processing logic of embodiments herein may be implemented as a functional block of a video decoder implementation.

Some or all of the foregoing CNN based synthesized view quality enhancement system functionality may be implemented as logic configured for performing operation consistent with that described herein. Such logic may be implemented in one or more special purpose processors (e.g., Application Specific Integrated Circuit (ASIC), Field Programmable Gate Array (FPGA), Graphics Processing Unit (GPU), etc.) and/or one or more general purpose processors (e.g., processors from the Intel CORE line of processors) executing code (e.g., instruction sets) for performing the requisite functions. When implemented in software, elements of a CNN based synthesized view quality enhancement system and/or other aspects of embodiments of the present invention may comprise the code segments to perform the necessary tasks, wherein the program or code segments can be stored in a processor readable medium. The "processor readable medium" may include any medium that can store or transfer information. Examples of a processor readable medium include an electronic circuit, a semiconductor memory device, a Read Only Memory (ROM), a flash memory, an Erasable ROM (EROM), a Compact Disk (CD) ROM, an optical disk, a hard disk, a fiber optic medium, etc.

Figure 4:
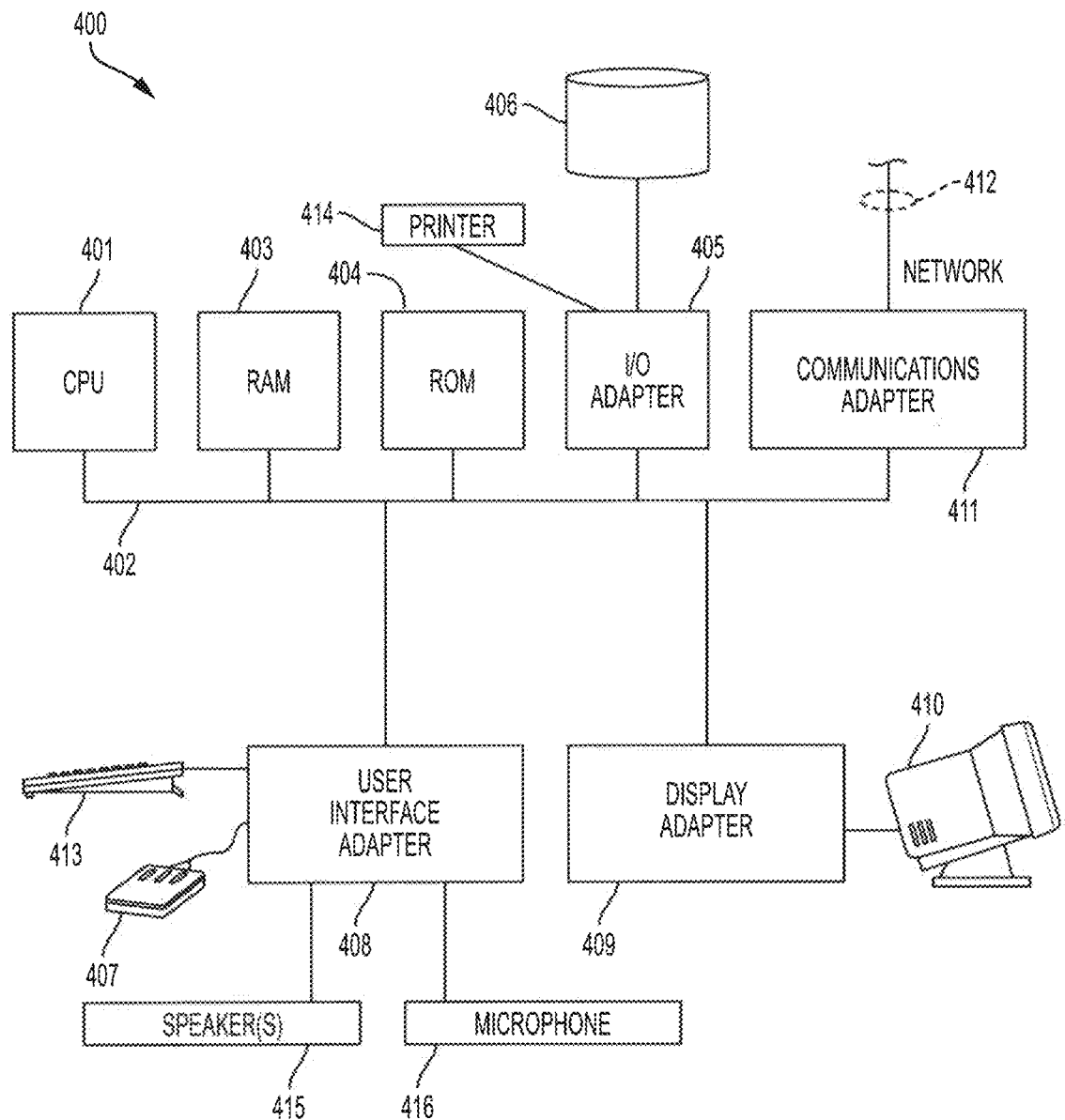
FIG. 4 shows a computer system as may be utilized in implementing CNN based synthesized view quality enhancement, or portions thereof, of embodiments of the present invention.

FIG. 4 illustrates computer system 400 as may be utilized in implementing embodiments of the present invention and/or portions thereof, such as CNN based synthesized view quality enhancement system 300 of FIG. 3. Central Processing Unit (CPU) 401 is coupled to system bus 402. CPU 401 may be any general purpose CPU, such as an Intel CORE processor. However, the present invention is not restricted by the architecture of CPU 401 as long as CPU 401 supports the inventive operations as described herein. Bus 402 is coupled to Random Access Memory (RAM) 403, such as may comprise SRAM, DRAM, SDRAM, etc. ROM 404 is also coupled to bus 402, which may comprise PROM, EPROM, or EEPROM. RAM 403 and ROM 404 may operate to store user and system data and programs (e.g., the aforementioned instruction sets) as is well known in the art.

Bus 402 is also coupled to Input/Output (I/O) controller 405, communications adapter 411, user interface adaptor 408, and display adaptor 409. I/O adapter 405 connects storage devices 406, such as may comprise one or more of a hard drive, a CD drive, an optical drive, etc., to the computer system. I/O adapter 405 is also connected to printer 414, which would allow the system to print paper copies of information such as document, photographs, articles, etc. Note that the printer may be a printer (e.g. dot matrix, laser, etc.), a fax machine, a copier machine, etc. Communications adaptor 411 is adapted to couple computer system 400 to network 412, which may be one or more of a telephone network, a local area network (LAN), a wide-area network (WAN) network, a cellular network, the Internet, and/or one or more other networks. User interface adaptor 408 couples user input devices, such as keyboard 413, pointing device 407, and microphone 416, to the computer system 400. User interface adaptor 408 also provides sound output to a user via speaker(s) 415. Display adaptor 409 is driven by CPU 401 to control the display on display device 410.

Referring again to FIG. 3, CNN based synthesized view quality enhancement system 300 of the illustrated embodiment comprises a video encoder configured for CNN based synthesized view quality enhancement, shown as CNN based SVQ enhancement encoder 310. For example, CNN based SVQ enhancement encoder 310 of the illustrated embodiment comprises CNN based reference synthesized view enhancement logic 311 and Lagrange multiplier logic 312 configured to provide CNN based synthesized view quality enhancement, as discussed in further detail below. In operation of CNN based SVQ enhancement encoder 310, CNN based reference synthesized view enhancement logic 311 may implement learned CNN models for considering geometric and compression distortions according to the specific characteristics of a synthesized view. Lagrange multiplier logic 312 of embodiments may derive the RD cost function to adapt the CNN based reference synthesized view enhancement logic View Synthesis Optimization (VSO) process to embrace better 3D video coding performance. CNN based SVQ enhancement encoder 310 is operable to encode texture video data and depth video data (e.g., using texture and depth encoding logic 313, such as may provide coding in accordance with 3D HEVC, etc.) for transmission (e.g., via transmission channel 320) to one or more clients or other devices (e.g., for playback, storage, etc.). CNN based SVQ enhancement encoder 310 may, for example, be implemented by a host system (e.g., media server, image processing server, personal computer, smartphone, tablet device, etc., such as may comprise an instance of computer system 400) to encode video data for transmission, storage, etc. (e.g., to/by one or more client devices).

Transmission channel 320 may comprise various transmission media suitable for transmission of encoded video data between devices, systems, etc. For example, transmission channel 320 may comprise one or more networks (e.g., a Local Area Network (LAN), a Storage Area Network (SAN), a Wide Area Network (WAN), a Personal Area Network (PAN), the Internet, a cellular network, and/or the like) using wireless, wireline, optic, etc. transmission media. In accordance with some embodiments, transmission channel 320 may comprise media for local transmission (e.g., data bus, Universal Serial Bus (USB), etc.) utilized by system (e.g., computer system 400) hosting CNN based SVQ enhancement encoder 310 for transferring coded video to local storage (e.g., a storage device of storage devices 406).

CNN based synthesized view quality enhancement system 300 illustrated in FIG. 3 further comprises a decoder for decoding encoded texture video and depth video. For example, decoder logic 330 (e.g., such as may provide decoding in accordance with 3D HEVC, etc.) may be implemented by a host system (e.g., image playback device, personal computer, smartphone, tablet device, etc., such as may comprise an instance of computer system 400) for obtaining encoded video data and decoding texture video data and depth video data therefrom. Decoder logic 330 is operable to provide the decoded texture video data and depth video data to a virtual viewpoint generator of CNN based synthesized view quality enhancement system 300, such as CNN based SVQ enhancement virtual viewpoint generator 340.

CNN based synthesized view quality enhancement system 300 of the embodiment illustrated in FIG. 3 comprises a virtual viewpoint generator configured for CNN based synthesized view quality enhancement, shown as CNN based SVQ enhancement virtual viewpoint generator 340. For example, CNN based SVQ enhancement virtual viewpoint generator 340 of the illustrated embodiment comprises CNN based post-processing logic 342 configured to provide CNN based synthesized view quality enhancement, as discussed in further detail below. In operation of CNN based SVQ enhancement virtual view point generator 340, view synthesis logic 341 is operable to generate synthesized views (e.g., implementing synthesized view generation in accordance with Free-Viewpoint Video (FVV) view synthesis) using decoded texture video data and depth video data provided by decoder logic 330. CNN based post-processing logic 340 may implement learned CNN models to remediate mixed distortions with both warping distortion and compression distortion. CNN based SVQ enhancement virtual viewpoint generator 340, for example, be implemented by a host system (e.g., image playback device, personal computer, smartphone, tablet device, etc., such as may comprise an instance of computer system 400) to generate synthesized views enhanced in accordance with concepts herein.

To aid in understanding operation of CNN based reference synthesized view enhancement logic 311 to provide CNN based synthesized view quality enhancement according to embodiments of the invention, the synthesized image from original texture and original depth may be regarded as $V_r$ to measure the depth coding distortion in VSO, wherein $V_r$ inevitably includes artifacts which diminish its quality. Where the ground truth which is captured by camera is denoted a Y, the optimal filter that aims to restore $V_r$ to the perfect quality image Y can be obtained as follows:

$$\Theta_n^* = \arg_{\Theta_n} \min \|Y - V_n\|^2, V_n = \Psi_n(V_r, L_n, R_n \mid \Theta_n), \quad (5)$$

where $V_n$ is the enhanced result from $V_r$, $\theta_n$ is the filtering parameter, and $\Psi_n$ is a filtering function. It should be appreciated that equation (5) may be utilized by embodiments of a CNN based synthesized view quality enhancement system to achieve the parameters of CNN model for reference synthesized view enhancement, and thus may be implemented at a training stage (e.g., by training logic (not shown) of CNN based synthesized view quality enhancement system 300). Due to the mechanism of view synthesis (see C. Fehn, "Depth image based rendering (DIBR), compression, and transmission for a new approach on 3DTV", referenced above), the pristine texture images of left and right reference viewpoints, $L_n$ and $R_n$, are introduced as the inter-view information. The Wiener filter, which has been widely used in video coding, can be regarded as an instance of $\Psi_n$. However, the parameter $\theta_n$ cannot be generally applied to a wide range of video sequences, because it relays on the content of the frame. Accordingly, embodiments of CNN based reference synthesized view enhancement logic herein implement more sophisticated filtering.

CNN based reference synthesized view enhancement logic of embodiments operates to enhance $V_r$ by a CNN model due to its substantial performance improvement in many signal processing tasks. Moreover, implementing a learning based approach, CNN based reference synthesized view enhancement logic is enabled to learn the features adaptively with large amounts of training data.

In accordance with an embodiment of CNN based reference synthesized view enhancement logic, $\Psi_n$ in equation (5) is regarded as a CNN model, and $\theta_n$ is the whole parameter of CNN, including weight and bias. Accordingly, the following conclusion may be made:

$$\|Y-V_n\|^2 \leq \|Y-V_r\|^2, \quad (6)$$

which indicates that $V_n$ is closer to the ground truth Y than $V_r$. In this manner, the SVDC ($D_s$) in equation (4) is redefined to provide CNN based SVQ enhancement changed distortion ($D_n$) as follows:

$$D_n = \sum_{(x,y)} [V_c(x, y) - V_n(x, y)]^2 - \sum_{(x,y)} [V_o(x, y) - V_n(x, y)]^2. \quad (7)$$

Equation (7) may be utilized by embodiments of a CNN based synthesized view quality enhancement system to calculate the changed distortion with the learned CNN model (e.g., by CNN based reference synthesized view enhancement logic 311 of CNN based SVQ enhancement encoder 310).

It should be appreciated that, in 3D video systems, the number and the position of synthesized views are not typically available in the encoding process. Accordingly, the positions of synthesized views are generally fixed, and the assumption of 3 synthesized views is typically adopted in the VSO process. In other words, three synthesized views with the same interval have usually been generated by the associated depth (to be encoded), and the View Synthesis Distortion (VSD) is the average value of the differences between the generated synthesized views and reference synthesized views. Different from traditional filters, the CNN model for enhancing reference synthesized views implemented by CNN based reference synthesized view enhancement logic of embodiments can be used for any given video sequences, not just for a specific one. In addition, the position of synthesized views is not limited. Accordingly, embodiments of the present invention is applicable to cross synthesized view case.

In understanding operation of Lagrange multiplier logic 312 of embodiments to provide CNN based synthesized view quality enhancement, it should be appreciated that the reference synthesized view is enhanced (e.g., by CNN based SVQ enhancement changed distortion ($D_n$)) according to embodiments of the invention. Accordingly, the trade-off between synthesized view distortion and the coding bit in the RD cost function may be adjusted by operation of Lagrange multiplier logic of embodiments of the invention. A Lagrange multiplier of Lagrange multiplier logic may be derived according to the following:

$$\min\{J\}, J = \eta_s D_n + \eta_d D_d + \lambda_{new} R, \quad (8)$$

where $\lambda_{new}$ is a new Lagrange multiplier, as may be implemented by Lagrange multiplier logic in accordance with concepts of the present invention, when the CNN based SVQ enhancement changed distortion $D_n$ is adopted.

To derive $\lambda_{new}$ in equation (8) above, the relationship of $D_n$ (CNN based SVQ enhancement changed distortion) and $D_s$ (SVDC) may be analyzed. According to equations (4) and (7), the relationship between $D_n$ and $D_s$ may be built with a parameter ω (CNN based SVQ enhancement changed distortion to SVDC parameter), as follows:

$$\frac{D_n}{D_s} = \frac{\sum_{(x,y)}[V_c(x,y)-V_n(x,y)]^2 - \sum_{(x,y)}[V_o(x,y)-V_n(x,y)]^2}{\sum_{(x,y)}[V_c(x,y)-V_r(x,y)]^2 - \sum_{(x,y)}[V_o(x,y)-V_r(x,y)]^2} = \omega. \quad (9)$$

Figure 5A:
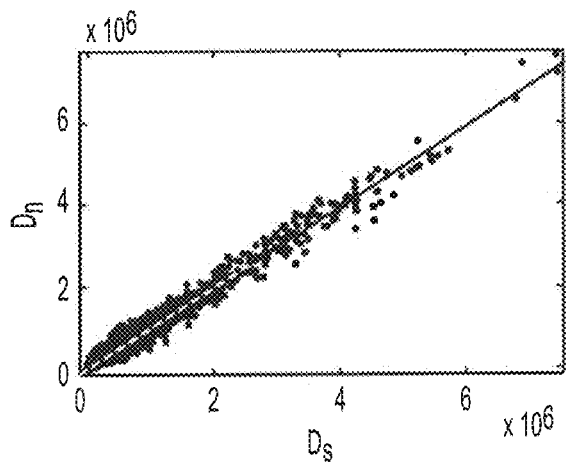
FIGS. 5A-5H shows the relationship between CNN based synthesized view quality enhancement changed distortion and SVDC for experimental data collected from a plurality of example video sequences.
Figure 5B:
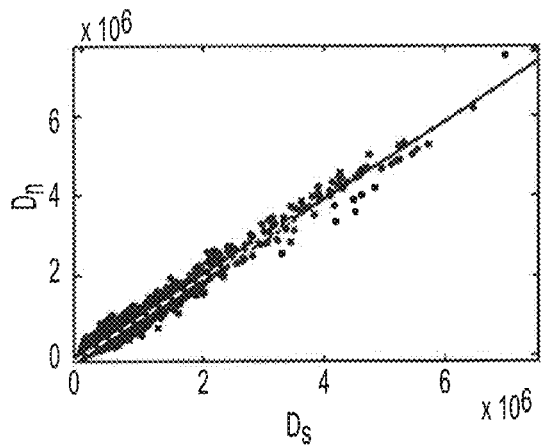
Figure 5C:
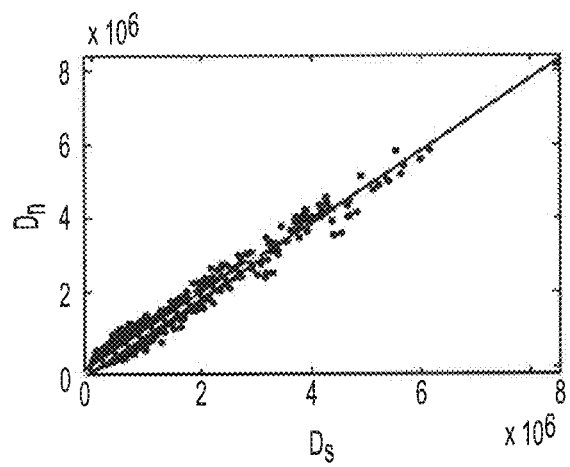
Figure 5D:
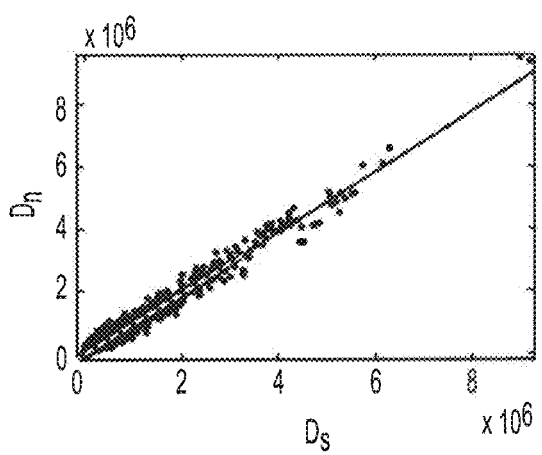
Figure 5E:
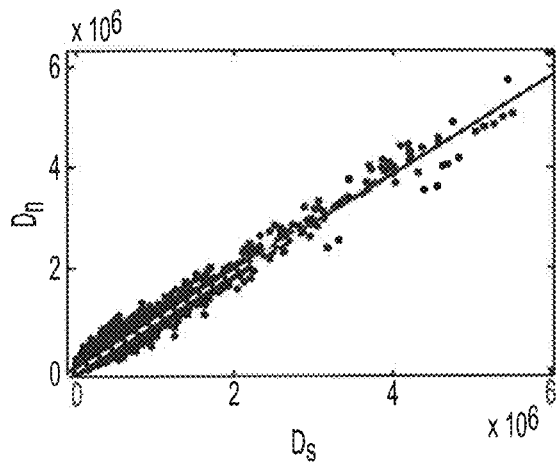
Figure 5F:
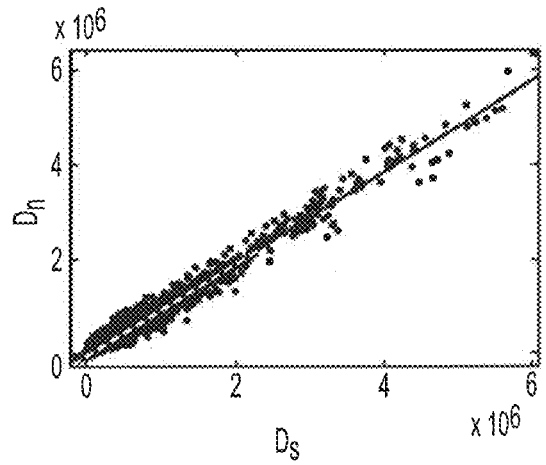
Figure 5G:
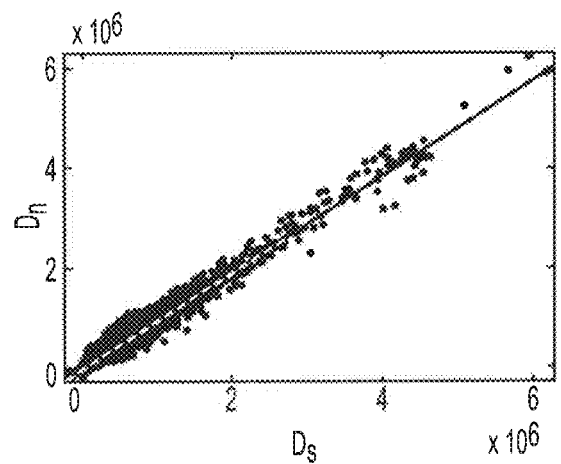
Figure 5H:
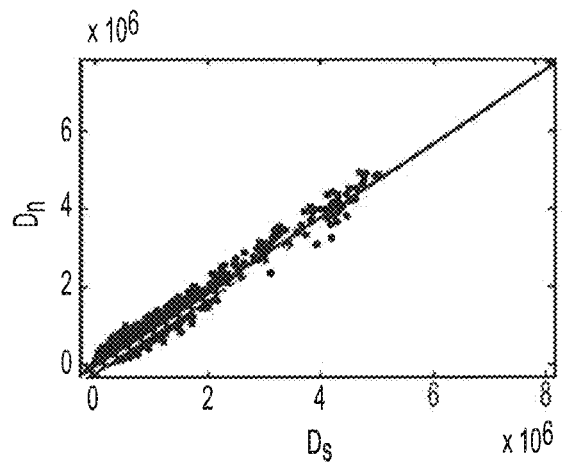

This relationship between $D_n$ and $D_s$ is shown in FIGS. 5A-5H. In particular, FIGS. 5A-5H show experimental data collected from a plurality of example video sequences (e.g., video sequences entitled "Kendo", "Lovebird1", "Pantomime", "Poznan Hall2", and "Poznan Carpark") illustrating the relationship between $D_n$ and $D_s$ under different settings (e.g., QPs). For simplicity, the relationship between $D_n$ and $D_s$ as shown in the plots of FIGS. 5A-5H, is fitted in a linear way to derive $\lambda_{new}$ in global. The relationship between $D_n$ and $D_s$ for $(QP_t, QP_d)=(27,36)$ are shown in FIG. 5A, where ω=0.9828, for $(QP_t, QP_d)=(30,39)$ are shown in FIG. 5B, where ω=0.9609, for $(QP_t, QP_d)=(32,41)$ are shown in FIG. 5C, where ω=0.9555, for $(QP_t, QP_d)=(35,42)$ are shown in FIG. 5D, where ω32 0.9537, for $(QP_t, QP_d)=(37,43)$ are shown in FIG. 5E, where ω=0.9534, for $(QP_t, QP_d)=(40,45)$ are shown in FIG. 5F, where ω=0.9457, for $(QP_t, QP_d)=(42, 46)$ are shown in FIG. 5G, where ω=0.9439, and for $(QP_t, QP_d)=(45,49)$ are shown in FIG. 5H, where ω=0.9285. The foregoing QP pairs used for texture and depth coding are recommended by the Common Test Conditions (CTC) (see K. Muller, and A. Vetro, "Common test conditions of 3DV core experiments", JCTVC of ITU-T SG16 WP3 and ISO/IEC JTC1/SC29/WG11, Tech. Rep. Doc. JCT3V-G1100, San Jose, US, Jan. 11-17, 2014, the disclosure of which is incorporated herein by reference). It can be appreciated from the foregoing that the fitting accuracies reach 0.9744, 0.9690, 0.9743, 0.9881, 0.9723, 0.9793, 0.9700, and 0.9977 under $(QP_t, QP_d)$ of (27,36), (30,39), (32,41), (35,42), (37, 43), (40,45), (42,46), and (45,49) for texture and depth coding, respectively.

With the relationship between $D_n$ and $D_s$ given in equation (9), the above mentioned new Lagrange multiplier ($\lambda_{new}$) can be derived by taking the derivative of equation (8) with respect to R and setting to 0, as follows:

$$\lambda_{new} = \quad (10)$$
$$-\frac{\partial(\eta_s D_s + \eta_d D_d)}{\partial R} = -\frac{\partial(\eta_s \omega D_s + \eta_d D_d)}{\partial R} = -\left[\omega\eta_s \frac{\partial D_s}{\partial R} + \eta_d \frac{\partial D_d}{\partial R}\right].$$

Similarly, the derivative of equation (2) with respect to R may be calculated and set to 0, as follows:

$$\lambda_{new} = -\frac{\partial(\eta_s D_s + \eta_d D_d)}{\partial R} = -\left[\eta_s \frac{\partial D_s}{\partial R} + \eta_d \frac{\partial D_d}{\partial R}\right]. \quad (11)$$

It can be seen from equations (10) and (11) the only difference lies in the parameter ω (i.e., the CNN based SVQ enhancement changed distortion to SVDC parameter).

The VSD may be estimated by depth map fidelity and horizontal gradient of texture of reference viewpoint (see B. T. Oh, and K.-J. Oh, "View synthesis distortion estimation for AVC and HEVC-compatible 3D video coding", *IEEE Trans. Circuits Syst. Video Technol.*, vol. 24, no. 6, pp. 1006-1015, Jun. 2014, the disclosure of which is incorporated herein by reference). For simplicity, $D_s$ may be represented by VSD to obtain the relationship between λ and $\lambda_{new}$, as follows:

$$D_s \approx \sum_{(x,y)} \frac{1}{4}\alpha^2 D_d(x,y)(\nabla_{T(x,y)})^2, \quad (12)$$

where α is a constant when the reference and virtual viewpoints are selected. $D_d(x, y)$ can be calculated by equation (3), and $\nabla_T$ is the gradient of the encoded texture of reference view. α may be calculated in accordance with the following:

$$\alpha = \frac{fL}{255}\left(\frac{1}{Z_{near}} - \frac{1}{Z_{far}}\right), \quad (13)$$

where $f$ is the focal length, L is the distance between reference and virtual viewpoints, $Z_{near}$ and $Z_{far}$ are the nearest and farthest depth value, respectively. The horizontal gradient $\nabla_{T(x,y)}$ may be calculated as follows:

$$\nabla_{T(x,y)} = |\tilde{S}_t(x,y) - \tilde{S}_t(x-1,y)| + |\overline{S}_t(x,y) - \overline{S}_t(x+1,y)|, \quad (14)$$

where $\overline{S}_t$ is the encoded texture of reference viewpoint.

With the relationship between $D_s$ and $D_d$ of equation (9), Mathematical Expectation (see e.g., Y. Zhang, X. Yang, X. Liu, G. Jiang, and S. Kwong, "High efficiency 3D depth coding based on perceptual quality of synthesized video", *IEEE Trans. Image Process.*, vol. 25, no. 12, pp. 5877-5891, Dec. 2016, the disclosure of which is incorporated herein by reference) may be applied to equations (10) and (11), and the new Lagrange multiplier $\lambda_{new}$ utilized according to embodiments achieved as follows:

$$\lambda_{new} = \lambda \frac{\omega\mu + \eta_d}{\mu + \eta_d}, \quad (15)$$

where μ can be represented as:

$$\mu = \frac{1}{W \times H} \sum_{(x,y)} \frac{1}{4} \eta_s \alpha^2 (\nabla_{T(x,y)})^2. \quad (16)$$

In the above, W and H indicate the width and height of the block.

It can be seen that, according to equation (15), the new Lagrange multiplier $\lambda_{new}$ equals to the original Lagrange multiplier λ if ω is 1. The parameters of $\eta_d$, $\eta_s$, W, H, and α can be regarded as constants. Accordingly, the horizontal gradient $\nabla_{T(x,y)}$ plays an important role in the relationship between $\lambda_{new}$ and λ. If the value of $\nabla_{T(x,y)}$ is very large, μ will be much greater than $\eta_d$, then $\lambda_{new} = \omega\lambda$. Whereas, if the value of $\nabla_{T(x,y)}$ is approaching zero, μ will be much less than $\eta_d$, then $\lambda_{new} = \lambda$. It should be appreciated that the calculation of $\nabla_{T(x,y)}$ can be directly extracted from the 3D HEVC encoder because of the calculation of VSD, thus leading to ignorable computational complexity with respect to implementations of CNN based synthesized view quality enhancement of embodiments of the invention.

In understanding operation of CNN based post-processing logic 342 of embodiments to provide CNN based synthesized view quality enhancement, it should be appreciated that the post-processing of the synthesized view at the decoder side of embodiments of the invention reduces artifacts analogous to the reference synthesized view enhancement. A difference, however, lies in that mixed distortions with both warping distortion and compression distortion are introduced in the synthesized view at the decoder side. Accordingly, different CNN training strategies may be adopted for the post-processing process of the CNN based post-processing logic and that of the CNN based reference synthesized view enhancement logic.

In implementing the CNN model for post-processing of the synthesized view by CNN based post-processing logic of embodiments of the invention, it may be supposed that $V_e$ is the synthesized result from encoded texture and encoded depth, and the synthesized result after post-processing $V_p$ can be represented as follows:

$$V_p = \Psi_p(V_e, L_e, R_e | \theta_p), \quad (17)$$

where $\theta_p$ is the parameter of CNN and $\Psi_p$ is the CNN model for post-processing. Equation (17) may, for example, be utilized by embodiments of a CNN based synthesized view quality enhancement system for post-processing of the synthesized view (e.g., by CNN based post-processing logic 342 of viewpoint generator 340). Different from the reference synthesized view enhancement of embodiments of CNN based reference synthesized view enhancement logic, the original texture image of reference viewpoint is unavailable, and $L_e$ and $R_e$ represent the encoded texture images of left and right reference viewpoints. In accordance with embodiments of CNN based post-processing logic, the parameter of CNN may be achieved as follows:

$$\theta_p^* = \arg_{\theta_p} \min \|Y - V_p\|^2, \quad (18)$$

where Y is the ground truth captured by camera. Equation (18) may be utilized by embodiments of a CNN based synthesized view quality enhancement system to achieve the parameters of CNN model for post-processing, and thus may be implemented at a training stage (e.g., by training logic (not shown) of CNN based synthesized view quality enhancement system 300). It should be appreciated that, in operation of CNN based post-processing according to embodiments of the invention, different CNN models may be trained for different distortion levels.

The architecture CNN models as may be implemented by CNN based reference synthesized view enhancement logic and/or CNN based post-processing logic of embodiments may comprise a plurality of convolutional layers. For example, CNN 600 shown in the exemplary embodiment of FIG. 6 comprises four convolutional layers. It should be appreciated, however, that more or fewer convolutional layers may be implemented according to embodiments of the invention, wherein more convolutional layers will increase the computational complexity of the CNN based synthesized view quality enhancement system, while fewer convolutional layers will degrade the performance gain provided by the CNN based synthesized view quality enhancement system.

Figure 6:
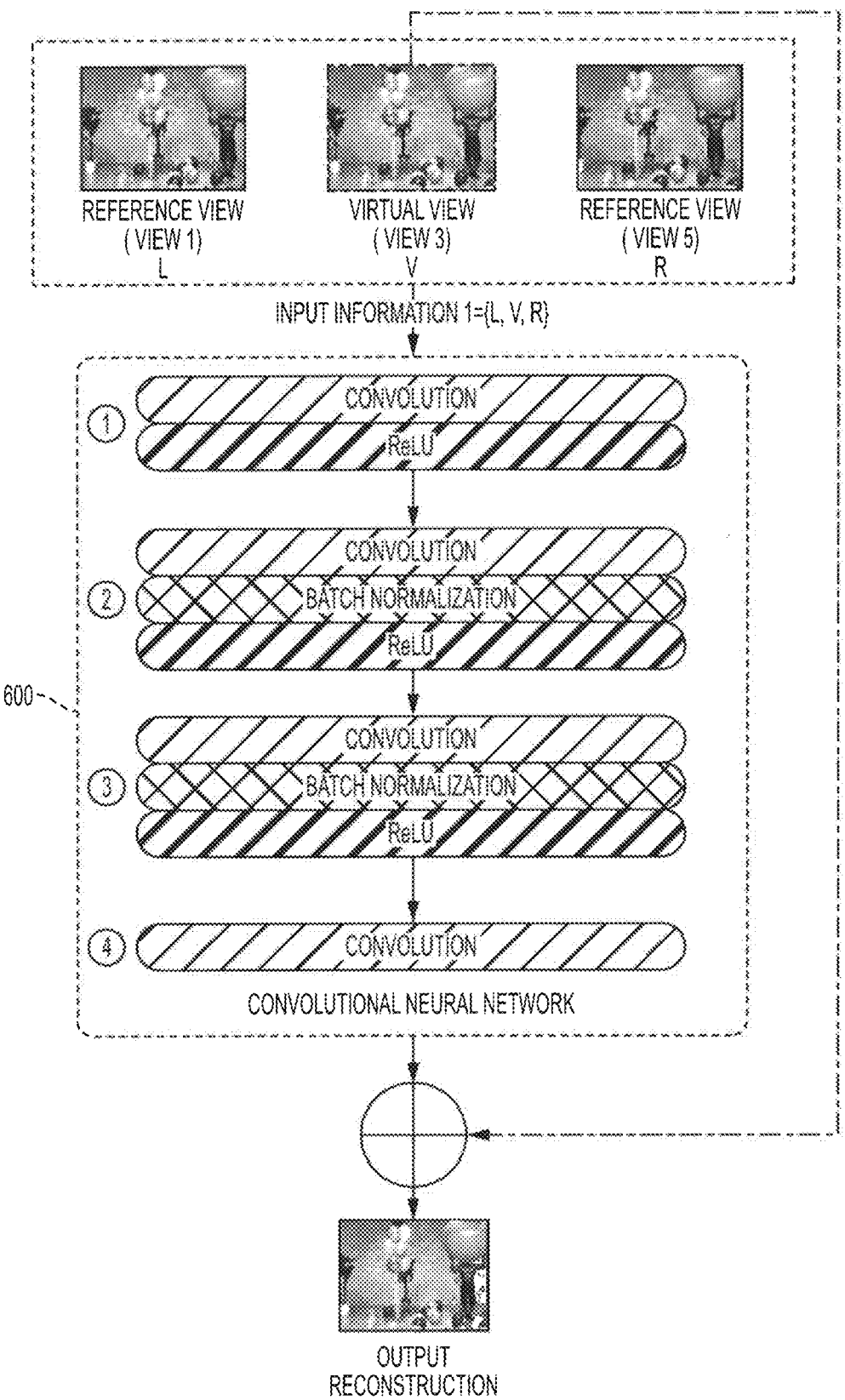
FIG. 6 an exemplary architecture CNN model as may be implemented by CNN based reference synthesized view enhancement logic and/or CNN based post-processing logic of embodiments of the present invention.

In a first layer of CNN 600 of the exemplary implementation illustrated in FIG. 6 there are three images of input and 64 feature maps of output with filtering window size of 3×3. To facilitate generation of various virtual viewpoints between two reference viewpoints the DIBR technique, the left and right reference views are added as input to the CNN model for providing useful pixel information from inter-view domain. In accordance with the illustrated implementation, the input I includes the distorted synthesized image V as well as the texture images of the left and right reference viewpoints, L and R, i.e., I={L, V, R}. The outputs are non-linear mapped by activation function of Rectified Linear Unit (ReLU). Accordingly, the processing of the first layer may be formulated as follows:

$$\Psi_1(I|W_1, B_1) = ReLU(W_1 * f(I) + B_1), \quad (19)$$

where $W_1$ and $B_1$ are the weight and bias in the first layer. The symbol "*" indicates convolution operation, and the activation function is given by the following:

$$\text{ReLU}(x) = \max(0, x), \quad (20)$$

where max( ) returns the maximum value. Moreover, I may be normalized to [0, 1] as follows:

$$f(I) = I/(2^n - 1), \quad (21)$$

where n represents the bit-depth of I.

In second and third layers of CNN 600 of the example of FIG. 6 the inputs are the outputs of prior layer, and the outputs are 64 feature maps after batch normalization (see S. Ioffe, and C. Szegedy, "Batch normalization: accelerating deep network training by reducing internal covariate shift", *International Conference on Machine Learning*, vol. 37, pp. 448-456, Lille, France, Jul. 7-9, 201, the disclosure of which is incorporated herein by reference) and ReLU. As with the first layer of CNN 600 discussed above, the filtering window sizes of the second and third layers of the exemplar implementation are both set as 3×3. Accordingly, the processing of the second and third layers may be formulated as follows:

$$\Psi_i(I|W_i, B_i) = \text{ReLU}(\text{BN}(W_i * \Psi_{i-1}(I|W_{i-1}, B_{i-1}) + B_i)), \quad (22)$$

where $W_i$ and $B_i$ are the weight and bias in the second and third layers, ($i \in \{2, 3\}$). BN( ) indicates the operation of batch normalization.

In contrast with the other layers, in the last layer (i.e., fourth layer of the exemplary implementation) only the convolution operation may be performed, without batch normalization and ReLU, according to embodiments. Moreover, the residual learning is considered, and the synthesized image with distortion is added to the output from the last layer as the final enhanced view. The processing of the last layer may be formulated as follows:

$$\Psi_4(I|W_4, B_4) = W_4 * \Psi_3(I|W_3, B_3) + B_4 + f(V), \quad (23)$$

where $W_4$ and $B_4$ are the weight and bias in the last layer. The final pixel value may be clipped into the valid range as follows:

$$\Psi(I|\theta) = \min(\max(0, f^{-1}(\Psi_4(I|W_4, B_4))), 2^n - 1), \quad (24)$$

where θ denotes the whole parameter set of CNN, $\Psi$ is the CNN model, min( ) returns the minimum value, and the function $f^{-1}(I)$ is the inverse operation of $f(I)$, wherein:

$$f^{-1}(I) = I \times (2^n - 1). \quad (25)$$

An objective of training a CNN as may be implemented in CNN based reference synthesized view enhancement logic and/or CNN based post-processing logic of embodiments is to minimize Mean Squared Error (MSE) between ground truth and the synthesized view using the Stochastic Gradient Descent (SGD) with error backpropagation algorithm, $$\ell(\Theta) = \frac{1}{N} \sum_{m=1}^{N} \|\Psi_4(I_m | W_4, B_4) - f(Y_m)\|^2, \quad (26)$$

where N is the number of batch sizes.

For the training data of CNN based reference synthesized view enhancement in VSO according to embodiments, the images are preferably synthesized by the original texture and depth. Accordingly, for one synthesized image ($V_r$), two original texture images of left and right reference viewpoints ($L_n$, $R_n$) and associated ground truth are formed as a training pair. However, different CNN training strategies may be adopted with respect to the CNN based reference synthesized view enhancement and the CNN based post-processing of embodiments of the invention. Accordingly, for the training data of CNN based post-processing, preferably utilize video sequences under different settings (e.g., different QP pairs used for texture and depth coding). For example, the texture and depth videos of reference viewpoints may be jointly encoded by the 3D HEVC Test Model version 16.2 (HTM 16.2) (see e.g., G. Tech, "JCT-3V AHG report: MV-HEVC and 3D-HEVC software integration (AHG2)", JCT-VC of ITU-T SG16 WP3 and ISO/IEC JTC1/SC29/WG11, Tech. Rep. Doc. JCT3V00002, Geneva, CH, May. 27-31, 2016. [Online] Available: https://hevc.h-hi.fraunhofer.de/svn/svn 3DVCSoftware/tags/HTM-16.2, the disclosure of which is incorporated herein by reference) under four QP pairs of ($QP_t, QP_d$), (30,39), (35,42), (40,45), and (45,49). Four distorted levels of synthesized videos may thus be generated by the encoded texture and depth of this example. For one synthesized image ($V_e$), two encoded texture images of left and right reference viewpoints ($L_e$, $R_e$) and associated ground truth are incorporated as a training pair. In operation according to embodiments, for each distortion level, the CNN model may be trained individually.

The following table shows a sequence for training and testing an implementation of CNN, such as may be utilized in embodiments of CNN based reference synthesized view enhancement logic and/or CNN based post-processing logic of a CNN based synthesized view quality enhancement system. As shown in the example of the table below, ten multi-view sequences with different contents and resolutions are adopted. The synthesized images of training and testing may be generated by the 1D-FAST view synthesis software (see e.g., "JCT-3V AHG report: MV-HEVC and 3D-HEVC software integration (AHG2)" referenced above) and the ground truth images may be physically captured at the same viewpoint. Accordingly, two sets may be defined for cross-validation (i.e., Set 1 and Set 2). In each set of the example, five multi-view sequences are used for training and the remaining ones are used for testing. In the example of the table below, ten frames (e.g., the $1^{th}$, $11^{th}$, ..., and $91^{th}$ frames) of each training sequence are selected. The patch size of the example is set as 32×32 with the stride of 16, and the batch size is set to be 128. Therefore, in the example of the table below, there are a total of 1662 batches with 212736 patches. The TENSORFLOW open source machine learning framework available from Google, Inc. may be utilized for CNN training For example, training in accordance with the foregoing example may be executed using a TESLA K80 GPU, available from Nvidia Corporation, with 100 epochs (1662×100=166200 iterations), wherein the batch size and learning rate are set as 128 and $1 \times 10^{-4}$, respectively.

| Set 1 | Set 2 | Sequence | Resolution | Frame Rate | Reference Viewpoint | Virtual Viewpoint |
|---|---|---|---|---|---|---|
| Test | Train | Bookarrival | 1024 × 768 | 16.67 | 6, 10 | 8 |
| Train | Test | Kendo | | 30 | 1, 5 | 3 |

-continued

| Set 1 | Set 2 | Sequence | Resolution | Frame Rate | Reference Viewpoint | Virtual Viewpoint |
|---|---|---|---|---|---|---|
| Test | Train | Balloons | | | 4, 8 | 6 |
| Train | Test | Lovebird1 | | | 2, 6 | 4 |
| Test | Train | Newspaper | | | | |
| Train | Test | Pantomime | 1280 × 960 | | 37, 41 | 39 |
| Test | Train | Champagne Tower | | | | |
| Train | Test | Poznan_Hall2 | 1920 × 1080 | 25 | 5, 7 | 6 |
| Test | Train | Poznan_Street | | | 3, 5 | 4 |
| Train | Test | Poznan_Carpark | | | | |

As can be appreciated from the foregoing, embodiments of the present invention provide CNN based synthesized view quality enhancement configured to provide improved coding efficiency while maintaining synthesized view quality and/or to reduce the artifacts with respect to decoded images. Embodiments may apply CNN based synthesized view quality enhancement for video coding in commercial products with relatively minor revisions when applied to a 3D video codec. Such CNN based synthesized view quality enhancement according to embodiments may be utilized to significantly improve operation with respect to 3D video codecs and next generation worldwide 3D multimedia system, such as FVV, 3DTV broadcasting systems, and 3D video recording.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for video coding configured for enhanced synthesized view quality, the method comprising:
   providing Convolutional Neural Network (CNN) based reference synthesized view enhancement logic having learned CNN models configured for considering geometric and compression distortions according to specific characteristics of synthesized views;
   processing, by the CNN based reference synthesized view enhancement logic implementing one or more of the learned CNN models, input texture video data and depth video data by considering geometric and compression distortions according to characteristics of synthesized views of the input texture video data and depth video data to configure the input texture video data and depth video data for distortion elimination in a synthesized view;
   providing texture and depth encoding logic for joint texture and depth encoding of texture video data and depth video data; and
   encoding, by the texture and depth encoding logic, the texture video data and depth video data configured for distortion elimination by the CNN based reference synthesized view enhancement logic to provide CNN based synthesized view quality enhancement encoded video data.

2. The method of claim 1, wherein the processing of the input texture video data and depth video data by the CNN based reference synthesized view enhancement logic is formulated as an image restoration task for reconstructing latent distortion free synthesized images.

3. The method of claim 1, wherein the processing of the input texture video data and depth video data by the CNN based reference synthesized view enhancement logic provides a CNN based synthesized view quality enhancement changed distortion ($D_n$) with respect to processed texture video data and depth video data.

4. The method of claim 3, wherein the CNN based synthesized view quality enhancement changed distortion ($D_n$) is changed linearly with respect to an original Synthesized View Distortion Change (SVDC) ($D_s$) for the input texture video data and depth video data.

5. The method of claim 3, further comprising:
   replacing, in a View Synthesis Optimization (VSO) process, an original synthesized view from the input texture video data and depth video data with a reference synthesized view derived from the CNN based reference synthesized view enhancement logic.

6. The method of claim 5, further comprising:
   providing Lagrange multiplier logic configured for adapting the VSO process for use with respect to the CNN based synthesized view quality enhancement changed distortion; and
   processing, by the Lagrange multiplier logic, video data output by the CNN based reference synthesized view enhancement logic to derive a Rate Distortion (RD) cost function adapting the VSO process performed for depth coding performance optimization for using the CNN based synthesized view quality enhancement changed distortion.

7. The method of claim 6, wherein the processing video data output by the CNN based reference synthesized view enhancement logic comprises:
   adjusting a trade-off between synthesized view distortion and a coding bit in the RD cost function.

8. The method of claim 6, wherein the encoding the video data configured for distortion elimination by the CNN based reference synthesized view enhancement logic comprises:

encoding the texture video data and depth video data configured for distortion elimination by the CNN based reference synthesized view enhancement logic as output by the Lagrange multiplier logic to provide CNN based synthesized view quality enhancement encoded video data.

9. The method of claim 8, wherein the encoding of video data by the texture and depth encoding logic is in accordance with three dimensional extensions of High Efficiency Video Coding (3D HEVC).

10. The method of claim 8, wherein the CNN based synthesized view quality enhancement encoded video data is provided with improved coding efficiency while maintaining synthesized view quality.

11. The method of claim 10, wherein the improved coding efficiency comprises bit rate saving in terms of Peak-Signal-to-Noise Ratio (PSNR).

12. The method of claim 8, further comprising:
providing CNN based post-processing logic having learned CNN models configured to remediate mixed distortions with both warping distortion and compression distortion; and
processing, by the CNN based post-processing logic, texture video data and depth video data decoded from the CNN based synthesized view quality enhancement encoded video data to reduce artifacts in a synthesized view.

13. The method of claim 12, wherein the synthesized view comprises a cross synthesized view synthesized from decoded CNN based synthesized view quality enhancement encoded video data.

14. A Convolutional Neural Network (CNN) based View Synthesis Optimization (VSO) enhancement encoder configured for enhanced synthesized view quality, the CNN based VSO enhancement encoder comprising:
a memory storing processor-readable code; and
at least one processor coupled to the memory, the at least one processor configured to execute the processor-readable code to cause the at least one processor to:
provide distortion elimination in a synthesized view using CNN based reference synthesized view enhancement logic implemented in the at least one processor executing the processor-readable code having learned CNN models configured for considering geometric and compression distortions according to specific characteristics of synthesized views, wherein the CNN based reference synthesized view enhancement logic is coupled to
Lagrange multiplier logic implemented in the at least one processor executing the processor-readable code configured for adapting a VSO process for use with respect to the distortion elimination in the synthesized view; and
provide CNN based synthesized view quality enhancement encoded video data using texture and depth encoding logic implemented in the at least one processor executing the processor-readable code, coupled to the Lagrange multiplier logic, configured for joint texture and depth encoding of texture video data and depth video data provided by the CNN based reference synthesized view enhancement logic and the Lagrange multiplier logic.

15. The CNN based VSO enhancement encoder of claim 14, wherein the CNN based reference synthesized view enhancement logic implements one or more of the learned CNN models to process input texture video data and depth video data by considering geometric and compression distortions according to characteristics of synthesized views of the input texture video data and depth video data to configure the input texture video data and depth video data for the distortion elimination in the synthesized view.

16. The CNN based VSO enhancement encoder of claim 14, wherein processing by the CNN based reference synthesized view enhancement logic provides CNN based synthesized view quality enhancement changed distortion with respect to input texture video data and depth video data.

17. The CNN based VSO enhancement encoder of claim 16, wherein the CNN based synthesized view quality enhancement changed distortion is changed linearly with respect to an original Synthesized View Distortion Change (SVDC) for the input texture video data and depth video data.

18. The CNN based VSO enhancement encoder of claim 17, wherein the Lagrange multiplier logic processes video data output by the CNN based reference synthesized view enhancement logic to derive a Rate Distortion (RD) cost function adapting the VSO process performed for depth coding performance optimization for using the CNN based synthesized view quality enhancement changed distortion.

19. The CNN based VSO enhancement encoder of claim 14, wherein the texture and depth encoding logic comprises a three dimensional extensions of High Efficiency Video Coding (3D HEVC) codec.

20. The CNN based VSO enhancement encoder of claim 14, wherein the processor-readable code causes the at least one processor to:
remediate mixed distortions with both warping distortion and compression distortion using CNN based post-processing logic having learned CNN models.

21. The CNN based VSO enhancement encoder of claim 20, wherein the CNN based post-processing logic processes texture video data and depth video data decoded from the CNN based synthesized view quality enhancement encoded video data to reduce artifacts in a synthesized view.

22. A method for video decoding configured for enhanced synthesized view quality, the method comprising:
providing CNN based post-processing logic having learned Convolutional Neural Network (CNN) models configured to remediate mixed distortions with both warping distortion and compression distortion;
processing, by the CNN based post-processing logic, texture video data and depth video data decoded from encoded video data to reduce artifacts in a synthesized view; and
generating, by a virtual viewpoint generator, the synthesized view using the texture video data and depth video data processed by the CNN based post-processing logic.

23. The method of claim 22, wherein the encoded video data comprises CNN based synthesized view quality enhancement encoded video data.

24. The method of claim 23, further comprising:
providing CNN based reference synthesized view enhancement logic having learned CNN models configured for considering geometric and compression distortions according to specific characteristics of synthesized views;
processing, by the CNN based reference synthesized view enhancement logic implementing one or more of the learned CNN models, input texture video data and depth video data by considering geometric and compression distortions according to characteristics of synthesized views of the input texture video data and depth video data to configure the input texture video data and depth video data for distortion elimination in a synthesized view;

providing Lagrange multiplier logic configured for adapting a View Synthesis Optimization (VSO) process for use with respect to the distortion elimination in the synthesized view; and processing, by the Lagrange multiplier logic, video data output by the CNN based reference synthesized view enhancement logic to derive a Rate Distortion (RD) cost function adapting the VSO process performed for depth coding performance optimization for using video data having the distortion elimination in the synthesized view;

providing texture and depth encoding logic for joint texture and depth encoding of texture video data and depth video data; and encoding, by the texture and depth encoding logic, video data output by the Lagrange multiplier logic to provide the CNN based synthesized view quality enhancement encoded video data.

* * * * *